United States Patent
Rantze et al.

(10) Patent No.: US 6,293,468 B1
(45) Date of Patent: Sep. 25, 2001

(54) PULSED BARCODE SCANNER

(75) Inventors: Edward G. Rantze, Lawrenceville; Joseph M. Lindacher, Duluth, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/184,799

(22) Filed: Nov. 2, 1998

(51) Int. Cl.⁷ ..................................... G06K 7/10
(52) U.S. Cl. ................... 235/462.25; 235/462.36
(58) Field of Search ............ 235/462.25, 462.36

(56) References Cited

U.S. PATENT DOCUMENTS

| | | |
|---|---|---|
| 4,106,844 | 8/1978 | Bryndahl et al. . |
| 5,216,232 | 6/1993 | Knowles et al. . |
| 5,357,101 | 10/1994 | Plesko . |
| 5,422,753 | 6/1995 | Harris . |
| 5,477,383 | 12/1995 | Jain . |
| 5,506,394 | 4/1996 | Plesko . |
| 5,606,434 | 2/1997 | Feldman et al. . |
| 5,614,705 | 3/1997 | Nagano et al. . |
| 5,656,805 | 8/1997 | Plesko . |
| 5,682,255 | 10/1997 | Friesem et al. . |

*Primary Examiner*—Harold I. Pitts
(74) *Attorney, Agent, or Firm*—Francis L. Conte

(57) ABSTRACT

A barcode is scanned by a scanner having a laser emitting a pulsed laser beam which reflects off the barcode and is detected by a light detector. A receiver operatively joined to the light detector is tuned to the frequency of the pulsed laser beam for increasing signal gain.

16 Claims, 3 Drawing Sheets

PULSED BARCODE SCANNER

BACKGROUND OF THE INVENTION

The present invention relates generally to barcode scanners, and more specifically, to scanning efficiency thereof.

In a typical barcode scanner, a laser emits a beam which sweeps across a barcode and reflects a portion of the light back into the scanner. A typical one-dimensional barcode includes a series of alternating dark bars and white spaces of varying width which encode therein any desired information or data.

As the laser beam sweeps across the bars and spaces, light is absorbed by the dark bars and reflected off the white spaces at a data frequency or rate which varies as a function of the sweep speed and width of the bars and spaces. The faster the sweep and the smaller the width the higher the data rate, and the slower the sweep and larger the width the lower the data rate. And, as the distance of the barcode from the scanner increases, the data rate also increases, and the reflected light becomes weaker.

In a typical barcode scanner, a rotary spinner having a plurality of mirrored facets divides the laser beam into a corresponding number of segments which are reflected off a plurality of differently oriented pattern mirrors to form scan lines which project in an intersecting pattern once per revolution of the spinner. This maximizes the ability to scan a barcode placed at any orientation within the field of view of the scanner.

The light reflected from the barcode typically follows the reverse scanning path through the pattern mirrors and spinner to a collection mirror that focuses the light onto a photodetector to produce a corresponding electrical signal which is decoded in a suitable digital processor or decoder.

Since the reflected laser beam is relatively weak, the collection optics require suitably large size to maximize collected light within a reasonable scanner envelope for maximizing available signal to noise and improve scanning detection capability. Furthermore, since barcodes come in various sizes and may be positioned at various distances from the scanner, the scanner requires a relatively wide bandwidth video processing circuit for resolving the reflected laser beam at various data rates in a typical range of about 0.1–1.0 MHz.

However the wide bandwidth required for the varying data rate results in a correspondingly small signal gain in the video circuit. The small gain requires suitable signal strength from the photodetector, and correspondingly requires a suitably large area of the collection optics for capturing sufficient reflected light for completing a successful scan.

Accordingly, it is desired to increase scanner efficiency and reduce complexity and size thereof.

BRIEF SUMMARY OF THE INVENTION

A barcode is scanned by a scanner having a laser emitting a pulsed laser beam which reflects off the barcode and is detected by a light detector. A receiver operatively joined to the light detector is tuned to the frequency of the pulsed laser beam for increasing signal gain.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
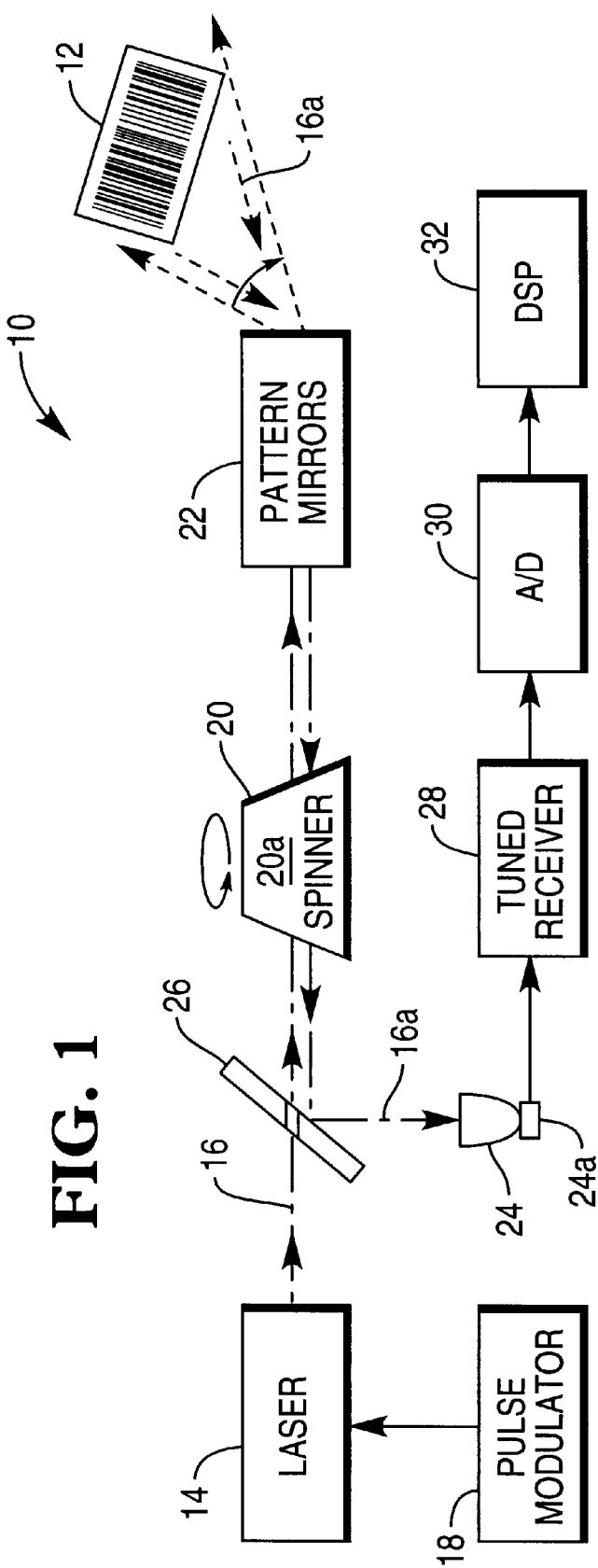
FIG. 1 is a schematic representation of a retro-reflective barcode scanner having a pulsed laser beam and tuned receiver in accordance with an exemplary embodiment of the present invention.

Illustrated schematically in FIG. 1 is a retro-reflective barcode scanner in accordance with an exemplary embodiment of the present invention. The scanner is an assembly of components mounted in a suitable housing having a window (not shown) above which may be positioned a barcode 12 having encoded therein any suitable data. The barcode may take any conventional form such as the one-dimensional barcode having parallel, dark bars and white spaces of varying width in accordance with the Universal Product Code (UPC) format, for example.

Means in the form of a conventional pulse-mode laser 14 are mounted in the housing for emitting or sweeping across the barcode a laser beam 16 pulsed or modulated at a predetermined pulse or carrier frequency. The laser 14 typically includes an associated pulse modulator 18 which cooperates therewith for pulsing the laser beam 16 at relatively high pulse frequency in the range of about 20–50 MHz, for example.

In the exemplary embodiment illustrated in FIG. 1, the sweeping means include a rotary spinner 20 and cooperating pattern mirrors 22. The spinner 22 is motor driven and includes a plurality of reflective facets 20a optically aligned with the laser 16 as shown in more detail in FIG. 2.

A suitable number of the pattern mirrors 22 are optically aligned with the spinner 20 for sweeping the laser beam 16 transversely across the barcode 12 as the spinner rotates. The individual spinner facets 20a divide the laser beam into segments which sweep across corresponding ones of the pattern mirrors 22 to project corresponding scan segments or lines through the scanner window over which the barcode 12 is positioned. The individual facets 20a and pattern mirrors 22 are oriented differently in space for correspondingly providing a number of typically intersecting scan lines in a pattern for each revolution of the spinner to increase the likelihood that at least one scan line will traverse the barcode 12 in sequence across the bars and spaces thereof.

The velocity of the scan line sweeping the barcode and the width of the bars and spaces thereof determine the data frequency or rate of the reflected laser beam, designated 16a, in which is encoded the data from the barcode 12. The reflected beam 16a is detected inside the scanner by a light sensor or detector 24 which produces an electrical signal which may then be decoded.

The scanner 10 illustrated in FIG. 1 is a retro-reflective system since the reflected beam 16a returns generally along the same path as the outbound laser beam 16 including in reverse order respective ones of the pattern mirrors 22 and facets 20a of the spinner 20. A collection mirror 26 in the form of a simple flat mirror with an aperture therethrough may be optionally positioned between the laser and the spinner for allowing the outbound laser beam 16 to reach the spinner and for deflecting the inbound reflected beam 16a laterally to the adjacent light detector 24.

This retro-reflective laser system is basically conventional in configuration but for the present invention which provides substantial improvements thereover. In a conventional laser scanner, the laser is a continuous wave (CW) laser and the spinner, pattern mirrors 22, and collection mirror 26 are all relatively large in area for maximizing the collection ability for the reflected beam 16a. The outbound laser beam 16 has maximum optical power and is efficiently reflected off the corresponding spinner and pattern mirrors for sweeping the barcode.

However, reflection of the laser beam from the barcode significantly decreases its optical power and only a fraction of the original light is returned into the scanner for detection by the light detector 24. The typical light detector is in the form of a photodiode having a limited rise time or frequency response, and the conventional video processing circuit has a suitably wide bandwidth for decoding the reflected beam over the exemplary data rate range of about 0.1–1.0 MHz. As indicated above, the wide bandwidth is accompanied by a correspondingly small signal gain which requires sufficient collection of the reflected beam in order to effect a successful barcode scan.

In accordance with the present invention, the laser 14 is a pulse-mode laser unlike the conventional continuous wave lasers typically found in barcode scanners, and cooperates with a corresponding receiver 28 in the form of a video electrical circuit operatively joined to the light detector 24 which is specifically tuned to the pulse frequency of the laser beam 16 for resolving the reflected laser beam 16a. Instead of sweeping a continuous wave laser beam across the barcode 12, the pulsed laser beam 16 at a predetermined pulse frequency is swept or scanned across the barcode and the reflection of the pulsed laser beam from the barcode is detected by the light detector 24 and resolved in the tuned receiver 28 at the specific pulse frequency.

The receiver 28 is preferably configured with a narrow bandwidth for detecting substantially only the pulse frequency of the laser beam 16, with a correspondingly high gain or signal amplification. In the preferred embodiment, the laser has a substantially constant pulse frequency and is used as a carrier wave to which the receiver 28 is specifically tuned.

As indicated above, the laser beam 16 is reflected off the barcode 12 at a data rate which is different than the pulse frequency of the laser beam. The data rate varies as a function of the sweep velocity of the laser beam across the barcode and the width of the bars and spaces thereof. As indicated above, the data rate may vary over a suitable range of about 0.1–1.0 MHz for a typical scanner and may have other values for other applications.

The laser beam pulse frequency, however, is substantially greater than the data rate in order to allow the reflected laser beam to be resolved for decoding the barcode 12. For example, the pulse frequency may be about an order of magnitude greater than the data rate and may be in the exemplary range of about 20–50 MHz.

The reflected laser beam 16a is therefore modulated in the same manner as in a conventional continuous wave laser scanner, however, with the pulsed laser beam providing substantial advantages thereover.

For example, since the receiver 28 is specifically tuned to the specific pulse frequency of the laser beam 16, it includes a correspondingly high gain as compared with the relatively low gain associated with a wide band signal circuit found in a conventional continuous wave laser scanners. The high gain substantially increases the signal-to-signal noise ratio of the reflected beam 16a for both improving the efficiency of scanning and allowing substantial reduction in complexity and size of the scanner itself. The high gain of the tuned receiver also renders the scanner more immune to ambient light which would otherwise decrease the efficiency of barcode scanning. Yet further, the high gain also allows a substantial size reduction in the various apertures associated with the reflecting mirrors and any lenses used in the scanner, and allows further advances in barcode scanner designs.

As indicated above, a conventional continuous wave laser scanner requires relatively large mirrors primarily for providing sufficient collection light area for the reflected laser beam. In contrast, the pattern mirrors 22 illustrated schematically in FIG. 2 may be substantially narrow in height to substantially match the sweeping path of the laser beam from the spinner 22. The light detector 24 is optically aligned with the spinner 20 for detecting the reflected laser beam, and has a field of view A which is correspondingly narrow with the pattern mirrors 22. The individual pattern mirrors 22 need only be sufficiently long for the desired length of the individual scan line segments of the outbound laser beam, and relatively narrow in height for receiving substantially less reflected light from the barcode which is collected by the light detector 24 and resolved at high gain in the tuned receiver 28.

Figure 2:
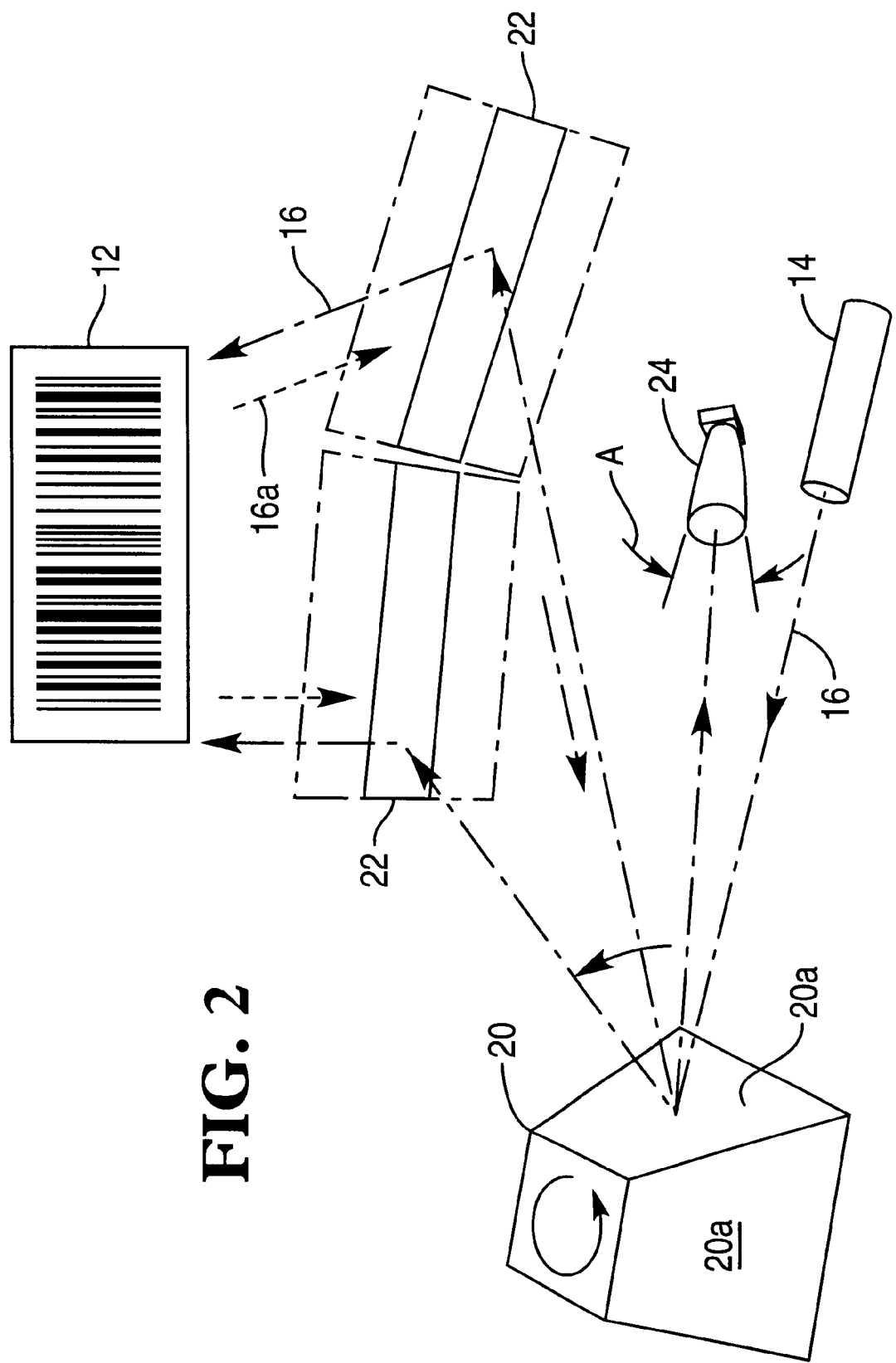
FIG. 2 is a schematic representation of the scanning and collection optics of the scanner illustrated in FIG. 1 in accordance with an exemplary embodiment of the present invention.

In the exemplary embodiment illustrated in FIGS. 1 and 2, the light detector 24 is coupled to the sweeping means for receiving the reflected light in primarily the same optical train as the outbound laser beam, but in reverse. The collection mirror 26 may be used for deflecting the reflected laser beam to the laterally disposed light detector 24, or the collection mirror 26 may be eliminated, with the light detector 24 being suitably optically aligned with the spinner for detecting the reflected beam therefrom.

As shown in FIG. 1, the tuned receiver 28 is preferably an analog device cooperating with the light detector 24 for producing an analog signal corresponding with the reflected laser beam 16a. A conventional analog-to-digital (A/D) converter 30 converts the analog signal to a digital signal which may readily be resolved or decoded in a digital signal processor (DSP) 32 of any conventional design. The digital signal provided from the receiver 28 to the processor 32 will have the same frequency as the pulse frequency of the laser beam 16 but will vary in amplitude due to the varying power of the reflected laser beam 16a effected by the barcode 12. The varying power may then be used to decode the barcode.

Accordingly, the outbound pulsed laser beam 16 is modulated in power by reflection from the barcode 12, and the reflected laser beam 16a is resolved in the tuned receiver 28 and processor 32 in amplitude modulation for decoding the barcode.

Since the laser beam 16 is modulated at a frequency substantially greater than the data rate from the barcode 12, the light detector 24 must have a correspondingly low rise time or correspondingly high frequency response for detecting the high-pulse frequency reflected beam 16a.

In a preferred embodiment illustrated in FIG. 1, the light detector 24 is in the form of a compound curvature collector for condensing the reflected laser beam onto an adjoining photodetector or photodiode 24a. Such compound curvature collectors are known in the art by various terms including Compound Parabolic Collector (CPC) or Compound Hyperbolic Collector (CHC), or derivatives thereof. These are nonimaging light collectors having various applications as described in the book entitled "High Collection Nonimaging Optics" by W. T. Welford and R. Winston, 1989, Academic Press, Inc. These collectors may be used alone, or in conjunction with a condensing lens for restricting the field of view thereof.

The photodiodes used in these collectors are very small and on the order of about 0.5 mm$^2$, with correspondingly small capacitance. It is conventionally known that the smaller the capacitance of a photodiode, the higher its frequency response. In order to detect the high frequency reflected pulsed-laser beam, the photodiode must be suitably small. However, the reflected light must be properly directed at the small photodetector for being detected thereby, with the compound curvature collector having this capability to collect and condense the light on the cooperating photodiode over a substantial field of view. Accordingly, the light detector 24 may tolerate substantial angular variations of the incident light thereon.

Since the light detector 24 may be configured for a field of view up to about 40° for example, it may be placed at various locations in the retro-reflective scanner 10 illustrated in FIGS. 1 or 2 to detect the reflected light, and may also be used to advantage in a static collection scanner.

Figure 3:
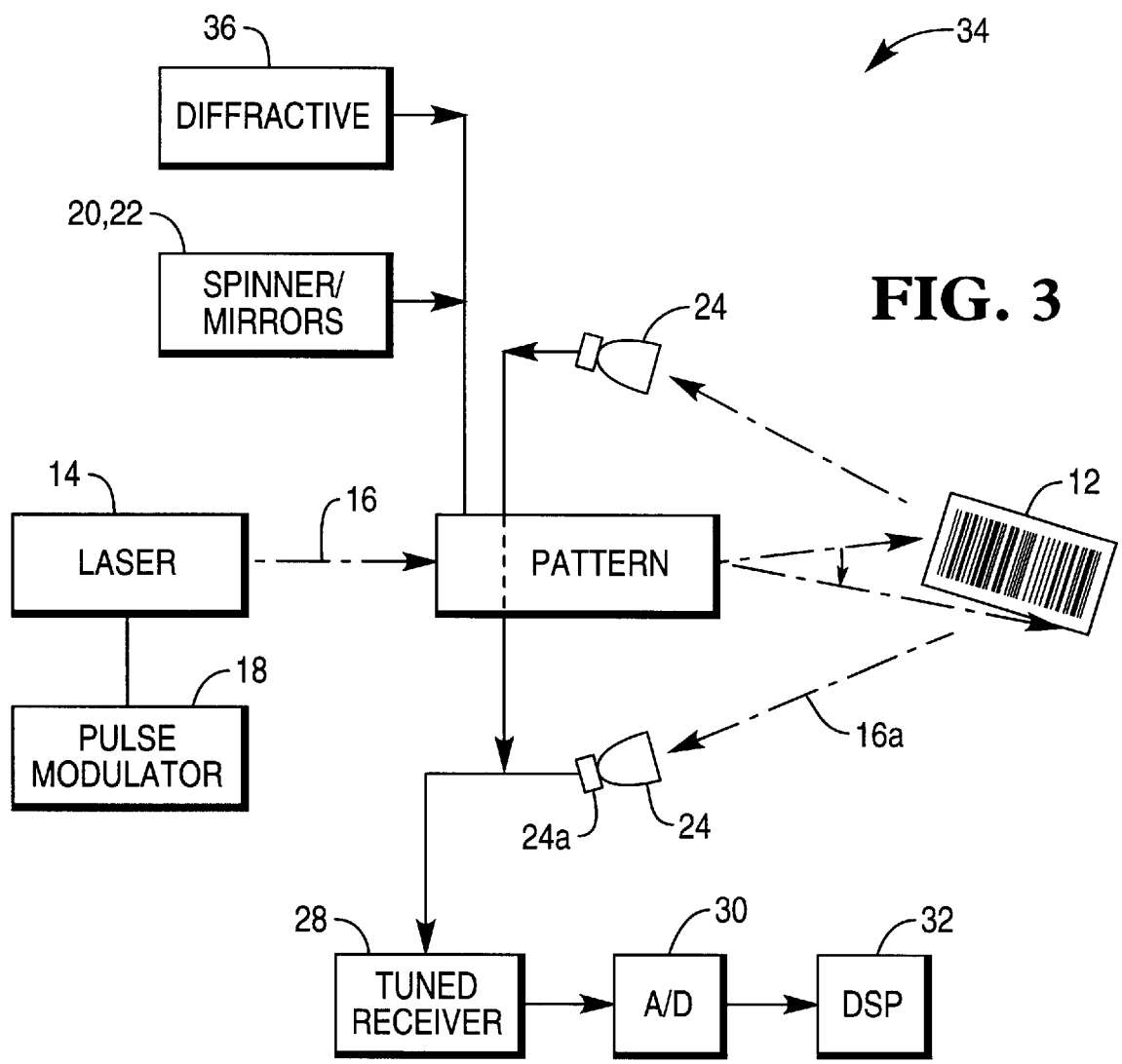
FIG. 3 is a static barcode scanner having a pulsed laser and tuned receiver in accordance with another embodiment of present invention.

FIG. 3 illustrates schematically a static collection barcode scanner 34 in which the light detector 24 is decoupled from the scanning or sweeping means. This embodiment may be substantially similar to the FIG. 1 embodiment including the pulsed laser 14 and cooperating spinner 20 and pattern mirrors 22 for producing the scan pattern across the barcode 12, but differs in that the reflected laser beam 16a is not collected in the scanning optics, but is instead collected directly by one or more of the compound curvature light detectors 24 operatively joined to the tuned receiver 28, converter 30, and processor 32. One or more of the light detectors 24 may be placed adjacent the scanner window for directly receiving the reflected laser beam 16a within a suitably large field of view of up to about 40°.

Since the light collection is decoupled from the scanning optics in the FIG. 3 embodiment, further improvements may be made in the scanning optics by using diffractive optics 36 instead of the spinner and pattern mirrors for producing the scan lines or pattern. Diffractive optics disperse an incident laser beam into multiple scan lines which may traverse the barcode 12 with low power. The light detector 24 and tuned receiver 28 may effectively detect the lower power reflected beam for decoding the barcode.

Accordingly, the use of the pulse mode laser beam and tuned receiver 28 substantially reduces the signal bandwidth and correspondingly increases the signal gain for providing substantial further improvements in scanner design. For the retro-reflective scanners, substantially thinner and more compact scanners may be designed with one or more light sources. The aperture requirements of such a scanner are significantly reduced which permits further improvements in scanner design. For the static collection scanner, diffractive optics and small injection molded optics may be used to advantage for generating the scan pattern with efficiency not previously possible.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A scanner for scanning a barcode comprising:
   a pulse-mode laser for emitting across said barcode a laser beam pulsed at a pulse frequency;
   a light detector for detecting said laser beam reflected off said barcode at a data rate different than said pulse frequency; and
   a receiver operatively joined to said light detector and tuned to said pulse frequency for resolving said reflected laser beam at said pulse frequency to decode said barcode.

2. A scanner according to claim 1 wherein said receiver includes a narrow bandwidth for detecting substantially only said pulse frequency, with a correspondingly high gain.

3. A scanner according to claim 2 wherein said pulse frequency is substantially constant.

4. A scanner according to claim 3 wherein said pulse frequency is greater than said data rate.

5. A scanner according to claim 3 wherein said light detector has a frequency response for detecting said reflected laser beam at said pulse frequency.

6. A scanner according to claim 3 further comprising a digital signal processor operatively joined to said receiver for decoding said reflected beam.

7. A scanner according to claim 3 further comprising means for sweeping said pulsed laser beam across said barcode, and said light detector is coupled to said sweeping means.

8. A scanner according to claim 7 wherein said sweeping means comprise:
   a rotary spinner having a plurality of reflective facets optically aligned with said laser;
   a plurality of pattern mirrors optically aligned with said spinner for sweeping said laser beam across said barcode; and
   said pattern mirrors being narrow in height to substantially match sweeping path of said laser beam from said spinner; and
   wherein said light detector is optically aligned with said spinner for detecting said reflected laser beam, and has a field of view correspondingly narrow with said pattern mirrors.

9. A scanner according to claim 8 wherein said light detector comprises a compound curvature collector for condensing said reflected laser beam onto an adjoining photodetector.

10. A scanner according to claim 3 further comprising means for sweeping said pulsed laser beam across said barcode, and said light detector is decoupled from said sweeping means.

11. A scanner according to claim 10 wherein said light detector has a large field of view for detecting said reflected laser beam from said barcode.

12. A method of scanning a barcode comprising:
   sweeping across said barcode a laser beam pulsed at a pulse frequency;
   detecting said laser beam reflected off said barcode at a data rate different than said pulse frequency by tuning to said pulse frequency; and
   decoding said barcode by resolving said detected pulsed laser beam at said pulse frequency.

13. A method according to claim 12 further comprising detecting substantially only said pulse frequency within a narrow bandwidth, and with a correspondingly high gain.

14. A method according to claim 13 wherein said pulse frequency is substantially constant.

15. A method according to claim 14 wherein said pulse frequency is greater than said data rate.

16. A method according to claim 15 wherein said pulsed laser beam is modulated in power by reflection from said barcode, and said reflected laser beam is resolved in amplitude modulation for decoding said barcode.

* * * * *